Jan. 14, 1930.                M. GOUDARD                1,743,966
                    REGULATION IN THE OUTPUT OF LIQUIDS
                  Filed Nov. 14, 1927      3 Sheets-Sheet 1
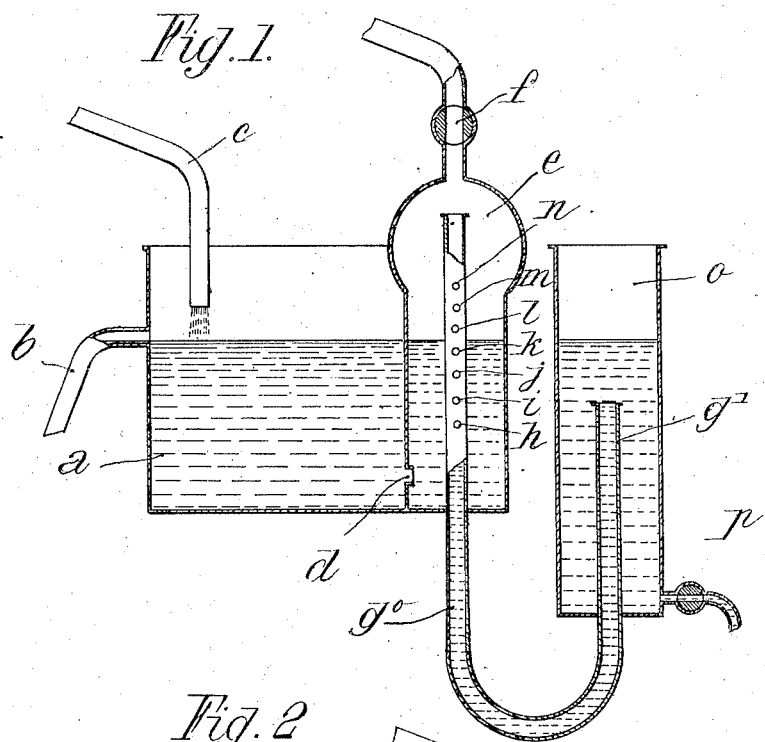
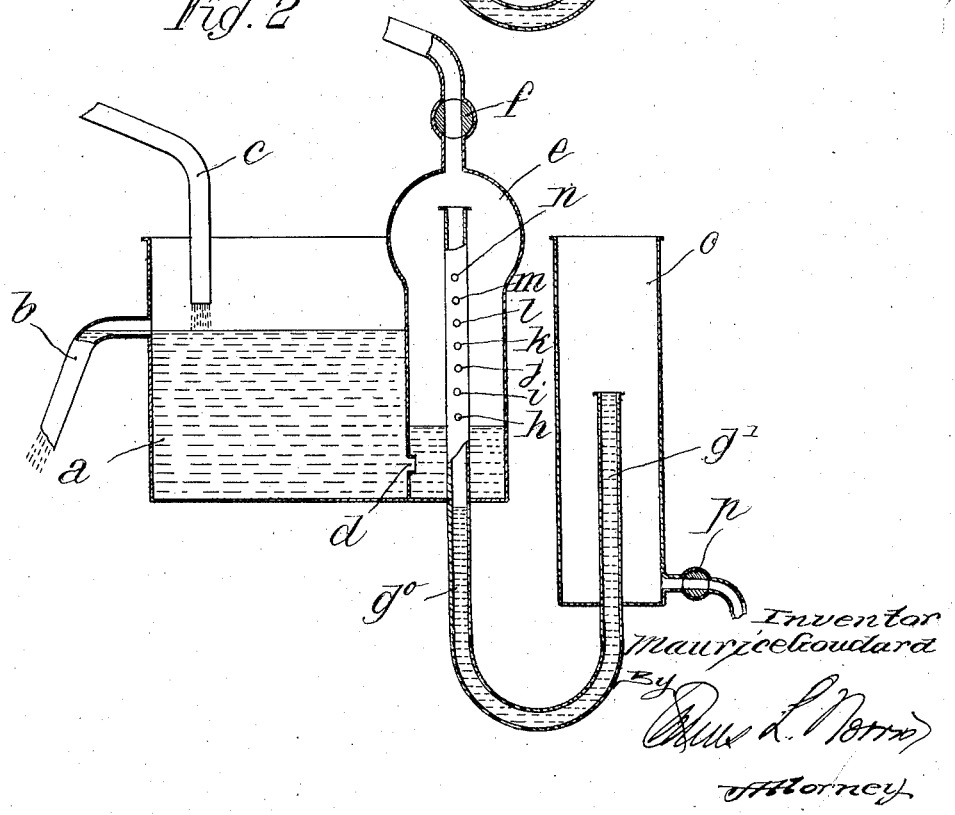
Inventor
Maurice Goudard Jan. 14, 1930. M. GOUDARD 1,743,966
REGULATION IN THE OUTPUT OF LIQUIDS
Filed Nov. 14, 1927 3 Sheets-Sheet 2

Inventor
Maurice Goudard
By
Attorney

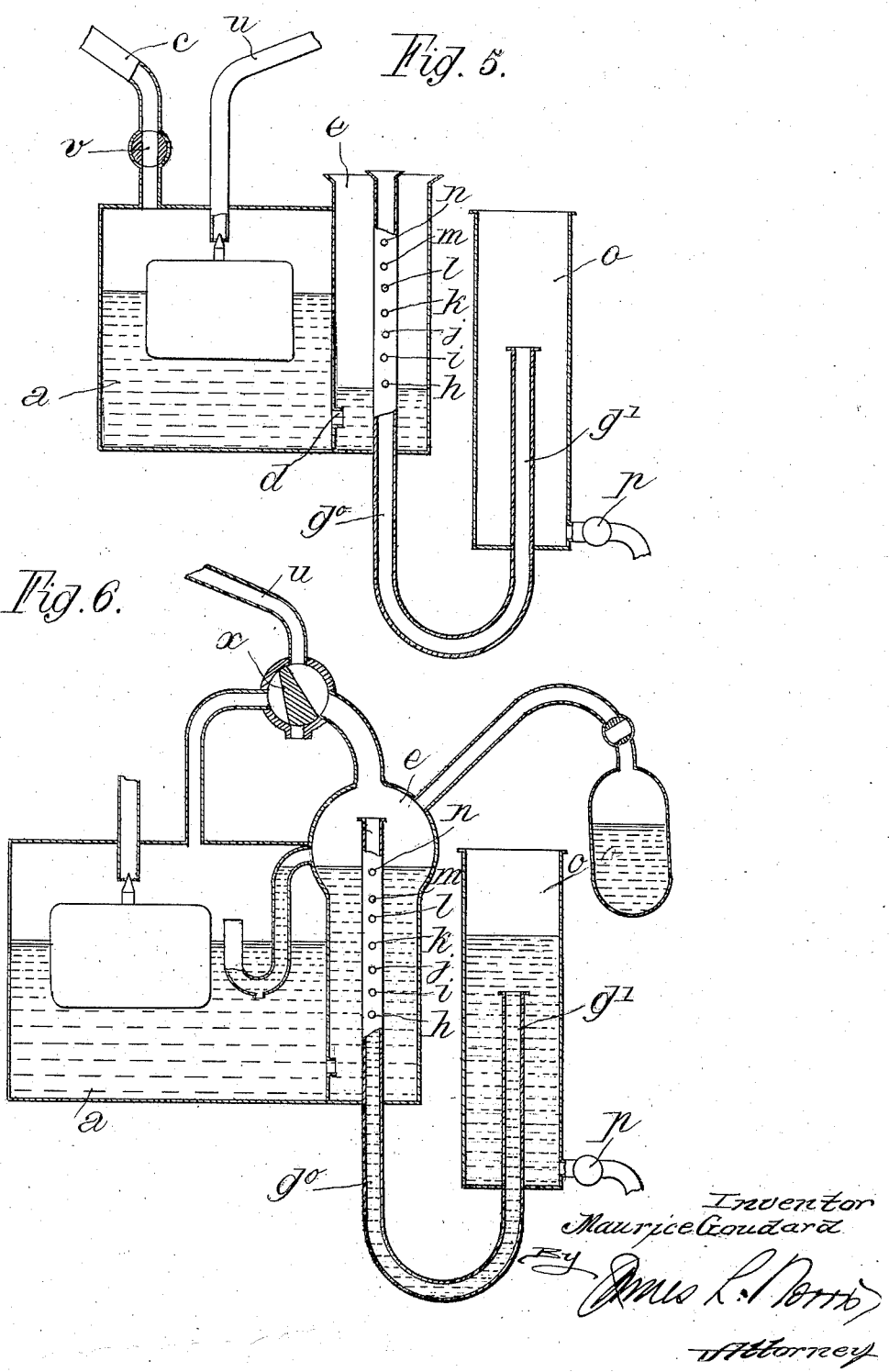

Patented Jan. 14, 1930

1,743,966

UNITED STATES PATENT OFFICE

MAURICE GOUDARD, OF NEUILLY-SUR-SEINE, FRANCE, ASSIGNOR TO "SOCIETE ANO-NYME SOLEX", OF NEUILLY-SUR-SEINE, FRANCE, A FRENCH SOCIETY

REGULATION IN THE OUTPUT OF LIQUIDS

Application filed November 14, 1927, Serial No. 233,295, and in Belgium November 20, 1926.

This invention relates to the regulation of the output of liquids, as a function of the pressure, or of the temperature, or as a function of the combination of both pressure and temperature.

As examples of possible industrial applications of the invention may be mentioned its adaptation to engines in which the output of liquid must be regulated and measured automatically for the purpose of obtaining the composition or saturation of gaseous mixtures as for example, in humidifiers for textile industry, apparatus for feeding liquid to burners, apparatus for feeding combustible liquid to internal combustion engines, such as injectors, carburetors or the like, in which the positive or negative pressure operating in the apparatus can be furnished and regulated by the operation of the engine or motor itself with which the apparatus forming the subject of the invention is combined, or in which the measured supply is to be varied as a function of the temperature.

One of the objects of the invention is to provide an apparatus capable of delivering liquid from a pair of reservoirs as a function of the difference of gaseous pressure in said reservoirs.

Another object is to provide means for controlling the output of a reservoir as a function of any local temperature.

A further object is to provide means for limiting the difference of pressure in two reservoirs arranged to deliver liquid as a function of pressure differential.

A still further object is to provide means responsive to both a local temperature change and a difference of pressure is two reservoirs to control the liquid discharged from said reservoirs.

Additional objects will appear in the course of the description now to be given with reference to the accompanying drawings, but it is to be observed that the description and drawings are given merely by way of example.

Fig. 1 shows in vertical section, and diagrammatically, an apparatus for regulating output constructed according to the invention.

Fig. 2 is a similar view of the same apparatus at a different period of operation.

Fig. 5 shows an apparatus also constructed according to the invention and comprising arrangements complementary to those of the preceding figures.

Figure 3:
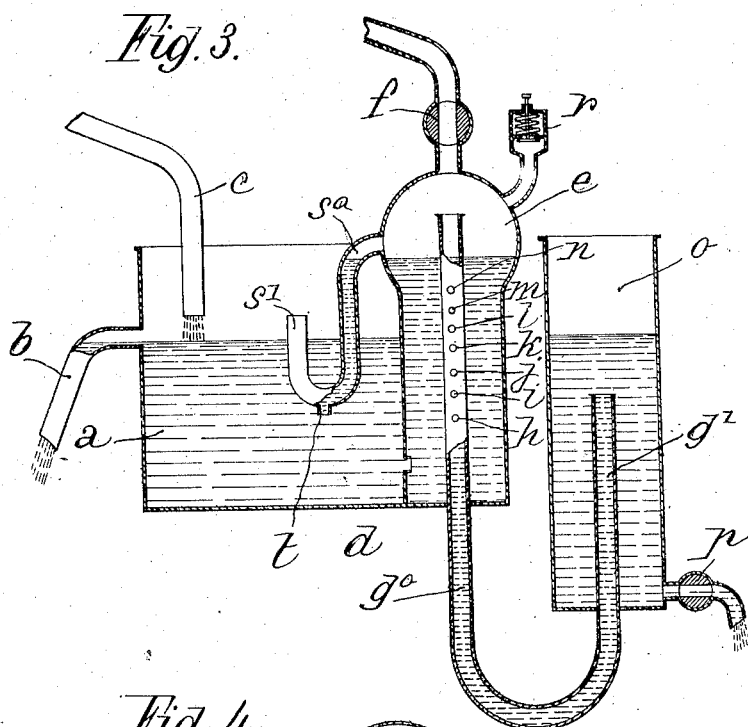
Fig. 3 shows the same apparatus as Figs. 1 and 2, at still another period of operation, and comprising an accessory device for limiting the different possible pressures between the two receptacles.

Finally, Fig. 6 shows a possible combination of methods of carrying out the invention already described.

According to the invention, and according to its principal features, the construction is substantially as follows.

$a$ is the principal reservoir or receptacle, communicating freely with a source of pressure for example, the atmosphere and in which liquid is maintained at a constant level by any suitable means, such for instance as a float controlling a needle valve regulating the inlet of liquid, as shown in Figs. 5 and 6, or, by means of an overflow pipe $b$ as shown in Figs. 1 to 4 through which the liquid supplied from the tube $c$, or in any other usual manner and rising above said overflow pipe, may flow away.

The principal receptacle or reservoir $a$ communicates at $d$ with a second receptacle or reservoir $e$, having at its upper portion a valve or tap $f$. Into this receptacle extends a tube $g^0$—$g^1$, constituting the oulet conduit from the apparatus and having in its branch $g^0$ which extends into the receptacle $e$ a series of orifices $h, i, j, k, l, m, n$, arranged at various stages.

The tube $g^0$—$g^1$ is bent into the form of an inverted siphon, the branch $g^1$ extending upwards and terminating at a lower level than that of the liquid in the whole apparatus, and more particularly at a lower level than the level in the reservoir $a$. The branch $g^1$ opens into an auxiliary receptacle $o$ provided with an outflow opening $p$ and is under atmospheric pressure.

With this construction the operation is as follows:

The liquid pours from the tube $c$ into the receptacle $a$, in which it is kept at a constant level, and from which it passes through the opening $d$ into the receptacle $e$.

If the receptacles $a$ and $e$ are under the same pressure, as for instance when the valve or tap $f$ is freely open to the atmosphere, the same level is maintained in the two receptacles, the openings $h, i, j, k$, at different heights being below the level for feeding the outlet tube $g^0$—$g^1$. The liquid runs through the tube to the branch $g^1$, which terminates below the constant level, into the auxiliary reservoir $o$. The outflow through $h, i, j, k$, varies with the outflow from $p$ and the receptacle $e$ for instance for an output from the orifice $p$ which is zero, the auxiliary reservoir $o$ becomes filled up to the overflow level.

The flow of the liquid in the apparatus is thus free as regards any difference of pressure existing in the receptacles $a$ and $e$, (Fig. 1) but if, for example, the valve or tap $f$ is connected to any source for producing a gas pressure on the surface of the liquid in the receptacle $e$, this pressure will be exerted upon the liquid therein until the position of equilibrium is obtained, depending upon the ratio of the pressures on the liquid in the two receptacles $a$ and $e$. As the level of the liquid in the receptacle $a$ is constant, and the liquid in said receptacle is ordinarily under atmospheric pressure, which is approximately constant, all the variations of level will take place in the receptacle $e$. The number of openings $h, i, j, k$, remaining below the level of the liquid in the receptacle $e$ therefore will vary with the pressure in the said receptacle.

The general result is a variation of output through the tube $g^0$—$g^1$ due to the pressure in the receptacle $e$, which makes it possible to regulate the output according to particular requirements.

The pressure in the receptacle $e$ may be sufficient to depress the level of the liquid therein below the communicating holes $h, i, j, k$, as shown in Fig. 2, thus completely suspending the outflow. The function of the siphon formed by the tube $g^0$—$g^1$ is then to prevent the escape of fluid. The construction is such that the top of the column of the liquid in the receptacle $e$ is always higher than the opening $d$ between the constant level chamber $a$ and the receptacle $e$. The result is that an excess of pressure in the receptacle $e$ will force the liquid through $d$ before it can escape at $g^1$.

Fig. 3 shows the operation in a somewhat different form of the invention when the pressure in the receptacle $e$ is negative, or below the atmospheric or other pressure exerted on the receptacle $a$. The level rises in the receptacle $e$ above a supplementary series of openings $l, m, n$, in the tube $g^0$—$g^1$ above the constant level of the apparatus as a whole and in addition to the output through the orifices $h, i, j, k$, there will be output through $l, m, n$.

Fig. 3 also shows an accessory arrangement for automatic limitation of the difference of pressure between the two receptacles $a$ and $e$, when a negative pressure, produced for instance by the working of the engine to which the apparatus is connected, may become too great in the receptacle $e$.

This accessory arrangement may consist simply of an automatic valve $r$ of any usual type in an extension pipe connected to the upper portion of the receptacle $e$ and adjustable so as to open at a given value of negative pressure in the receptacle $e$.

A hydraulic guard or safety device may be provided consisting of a siphon $s^0$—$s^1$, one branch of which opens into the upper portion of the receptacle $e$ and the other branch $s^1$ of which opens into the upper portion of the receptacle $a$ above the constant level. The bend is arranged to dip into the liquid below the constant level in the receptacle $a$ and pours liquid into the receptacle $a$ through a calibrated orifice $t$. The liquid thus poured through the orifice $t$ fills the bend of the $s^0$—$s^1$ and with variations of pressure in the receptacle $e$, the liquid rises in the branch $s^0$. As the output of the orifice $t$ is limited, a too strong variation of pressure in the receptacle $e$ causes the emptying of the siphon $s^0$—$s^1$ and establishes communication between the pressures in the two receptacles, whereupon communication is cut off by the filling of the siphon through the opening $t$. In this way a regulation and limitation of the difference of the pressures between the two receptacles is obtained.

Figure 4:
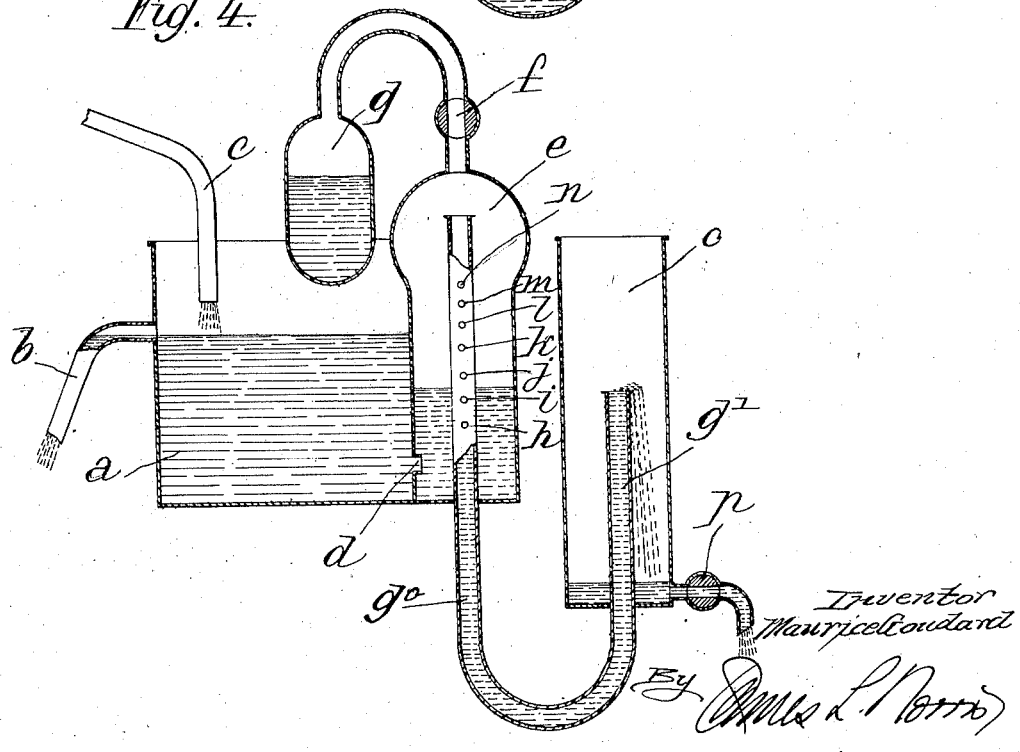
Fig. 4 shows, by way of example, an apparatus analogous to that shown in Figs. 1 and 2, but including means for utilizing the tension of the vapour of the liquid itself, or of an auxiliary liquid, for the operation of the apparatus.

In the constructional embodiment shown in Fig. 4 the valve $f$ connects the receptacle $e$ with a closed bell $q$, containing a relatively volatile liquid, exposed to the effects of heat and cold obtained in any convenient manner from the outside. The same effects as those described above are produced in the apparatus. A rise in temperature increases the vapour tension in the bell $q$ and consequently the pressure exerted in the receptacle $e$ causes progressively the isolation of the orifices $h, i, j, k$, for delivery whilst the lowering of the temperature by means of some source of cold, may reduce the pressure in receptacle $e$ until it is below the atmospheric pressure in the receptacle $a$, permitting the level in $e$ to rise so as to feed the supplementary orifices $l, m, n$.

According to the composition of the liquid flowing through the apparatus and the conditions of employment, it may not be desirable to provide an auxiliary closed bell, and the upper portion of the receptacle *e* may, by the closing or omission of the tap *f* constitute the closed bell in which the vapour tension of the liquid traversing the apparatus, or even the expansion of the air above the liquid in *e* may be made to produce, with variations of temperature, the required effects.

As already stated, the means for obtaining a difference of pressure between the two receptacles *a* and *e* are not limited, since a positive or negative pressure produced from any source, gas or vapour, through a tube (not shown) connected to the conduit shown diagrammatically in relation to the tap *f* containing this latter at any point in its course, may constitute a means of distant control for the apparatus and consequently a general means for regulating its output.

As already stated the application of variation of pressure is not limited to any particular receptacle. Variations may be produced in the receptacle *a* independently of those in the receptacle *e*, and simultaneously or not with the latter, producing similar functioning of the apparatus to that described above.

As an illustration of one of the many possible applications of the constructions described with reference to Figs. 1 to 4, is the utilization of variations of barometric pressure exerted on the receptacle *a* as means for automatically regulating the output of distributor devices for feeding or measurement liquids in apparatus in connection with aviation machines.

It is evident that the method of construction is by no means limited to that described with reference to Figs. 1 to 4, where application of pressure from an exterior source to the receptacle *e* is contemplated. An equivalent method of carrying out the invention as to functioning and result is possible with the application of pressures exterior to the receptacle *a* as indicated in the constructional embodiment shown at Fig. 5.

In this case the application of the pressure from the outer source is exerted in the receptacle *a* through a tube *c* provided with a valve or tap *v*. The receptacle *a* becomes the closed bell. The receptacle *e* is open freely to atmospheric pressure. The effect of variations of pressure on the levels in the two receptacles *a* and *e* are absolutely similar to those described for the preceding figures, so that it is not necessary particularly to explain the operation.

Fig. 6 shows a combined apparatus based on the last mentioned construction. The parts described with reference to Fig. 5 are reproduced, but the receptacle *e* is connected as shown in Figs. 1, 2 and 3 to an external source of pressure. The valves or taps *f* and *v* are combined into a single valve *x* with a plurality of passages, the manipulation of which valve is adapted to put either one of the receptacles *a* or *e* into communication with the atmosphere for instance, said valve being made triangular in section so as to be capable of distributing the pressures in conduit *u* between *a* and *e* in any desired proportion.

The devices shown in Figs. 5 and 6 are particularly adapted for use in apparatus where the float chamber is connected to a source of suction or of diminished pressure.

It is, of course to be understood, that the pressure equalizer shown in Fig. 3, and the temperature regulator represented in Fig. 4 may be attached to any of the devices shown in Figs. 1 to 5.

Having now particularly described and ascertained the nature of my said invention and in what manner the same is to be performed, I declare that what I claim is:—

1. A device of the class described comprising in combination a pair of communicating reservoirs, at least one of said reservoirs being closed, a conduit connected to, and adapted to carry a fluid controlling the gaseous pressure in the closed reservoir, and liquid discharge means operative to vary the total discharge from the pair of reservoirs in accordance with variations of the gaseous pressure in the closed reservoir.

2. A device of the class described comprising in combination a constant level reservoir, a reservoir in communication therewith, at least one of said two reservoirs being closed, means for maintaining a liquid at constant level in the constant lever reservoir, a conduit connected to, and adapted to carry a fluid controlling the gaseous pressure in, said closed reservoir, and liquid discharge means operative to vary the total discharge of liquid from the two reservoirs in accordance with the variations in gaseous pressure produced in the closed reservoir.

3. A device of the class described comprising in combination a constant-level reservoir, a reservoir in communication therewith, at least one of said two reservoirs being closed, a conduit communicating with the upper part of the closed reservoir and adapted to supply fluid thereto under varying gaseous pressures, and a discharge conduit extending into one of said reservoirs, said conduit having a plurality of orifices formed therein at different levels.

4. A device of the class described comprising in combination a constant level reservoir, a reservoir in communication therewith, at least one of said two reservoirs being closed, means for varying gaseous pressure in said closed reservoir, and liquid discharge means operative to vary the total discharge from the two reservoirs in accordance with variations of gaseous pressure in the closed reservoir.

5. A device of the class described comprising in combination a constant level reservoir, a reservoir communicating therewith, at least one of said two reservoirs being closed, means for varying the gaseous pressure in the closed reservoir as a function of the temperature, and liquid discharge means operative to vary the total liquid discharge from the two reservoirs in accordance with the gaseous pressure in the closed reservoir.

6. A device of the class described comprising in combination a constant level reservoir, a reservoir communicating therewith, at least one of said two reservoirs being closed, a conduit communicating with the upper part of the closed reservoir and adapted to carry a fluid controlling the gaseous pressure therein, liquid discharge means operative to vary the total discharge from the two reservoirs in accordance with the gaseous pressure in the closed reservoir, and means for limiting the difference of gaseous pressure in the two reservoirs.

7. A device of the class described comprising in combination a pair of communicating reservoirs, at least one of said reservoirs being closed, a conduit connected to, and adapted to carry fluid controlling the gaseous pressure in the closed reservoir, a discharge reservoir, a U-shaped discharge tube having one long branch extending into one of the pair of communicating reservoirs, said branch being provided with a plurality of perforations at different levels, and having a short branch terminating in the discharge reservoir above the level of communication between the pair of communicating reservoirs, the length of said short branch being greater than the maximum possible difference of level between said communicating reservoirs.

In testimony whereof I affix my signature.

MAURICE GOUDARD.